March 11, 1924.

E. A. JOHNSTON

SLIP OVER TIRE

Filed June 9, 1920

1,486,761

Inventor:-
Edward A. Johnston,
By Henry J. Savage
Atty.

Patented Mar. 11, 1924.

1,486,761

UNITED STATES PATENT OFFICE.

EDWARD A. JOHNSTON, OF CHICAGO, ILLINOIS, ASSIGNOR TO INTERNATIONAL HARVESTER COMPANY, A CORPORATION OF NEW JERSEY.

SLIP-OVER TIRE.

Application filed June 9, 1920. Serial No. 387,719.

*To all whom it may concern:*

Be it known that I, EDWARD A. JOHNSTON, a citizen of the United States, residing at Chicago, in the county of Cook and State of Illinois, have invented certain new and useful Improvements in Slip-Over Tires, of which the following is a full, clear, and exact specification.

My invention relates to means for adapting tractor wheels equipped with traction lugs for operation over public highways without injury to the roadway or the tractor. The wheels of farm tractors are generally equipped with traction lugs formed from angle irons or other shapes attached to the rim. These lugs are very satisfactory, as well as necessary, when the tractor is propelling an implement or other load over relatively soft ground, but are objectionable when operating on the highway since the lugs are destructive of the hard surface of the roadway and many of the States have passed or pending legislation prohibiting the operation of tractors equipped with traction lugs upon improved roads.

Various expedients have been proposed for rendering the tractor suitable for use on both soft ground and hard roads, chief among which are detachable lugs that are secured to the wheel rim by bolts or removable pins when the tractor is to be used in the field and are removed so that the wheel rim is smooth when used on the road. But no means yet proposed has been satisfactory because the bolts or other securing means soon become so bent and rusted as to be almost impossible of removal, and even when in good condition, the time and labor required for attachment or removal of the lugs are prohibitive. It has therefore become necessary, if all capabilities of farm tractors are to be realized, to provide means for adapting the tractor wheels for use on the roads that is of low first cost, requires few repairs, and can be quickly and easily applied or removed.

With the above noted deficiencies and requirements in mind, I have invented a slip-over tire for tractor wheels that is cheap to manufacture, quick to secure to or remove from the wheel, subject to little wear, adapted to take up such wear as may occur, and meet all legal requirements of the several States.

It is therefore an object of my invention to provide a slip-over tire for tractor wheels that will adapt the tractor for use on public highways.

Another object of my invention is to provide a slip-over tire that may be attached to the traction lugs of the wheel.

Still another object is to provide a slip-over tire having means engaging the traction lugs to maintain the tire rigidly in position on the wheel and relieve the securing means of undue stress.

A still further object is to provide a slip-over tire that will be tight on the wheel under all conditions of operation and will automatically take up any wear of the traction lugs or engaging means.

The above and other objects will be apparent from the description of my invention illustrated in the accompanying drawings in which;

Figure 1:
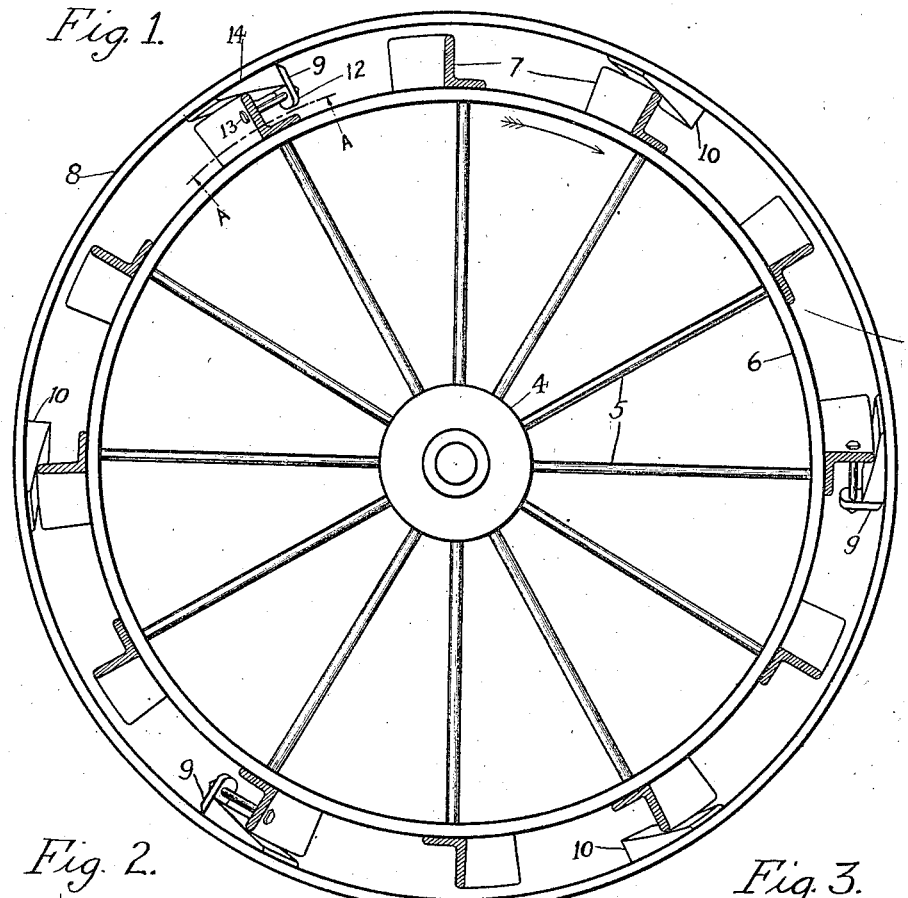
Figure 1 is a section of a tractor wheel showing my invention applied thereto, the section being taken just outside of the wheel rim but through the overhanging lugs.

In Fig. 1 there is shown a tractor wheel having a hub 4, spokes 5, and rim 6 to which the traction lugs 7 are secured by rivets or bolts as is usual in the art. These lugs are shown as being formed from angle irons extending diagonally across the face of the wheel but their exact form is immaterial and lugs of any desired contour may be employed. A smooth tire 8 of a width suitable to support the load without injury to the highway encompasses the lugs 7 and has a plurality of cams 9, 10 secured to its inner periphery by rivets 11, or the cams may be formed integral with or welded to the tire, if desired. The cams 9 and 10 are similar in all respects with the exception that each of the cams 9 is provided with a lug 12, adapted to receive a bolt 13 to secure the tire to the wheel.

Figure 2:
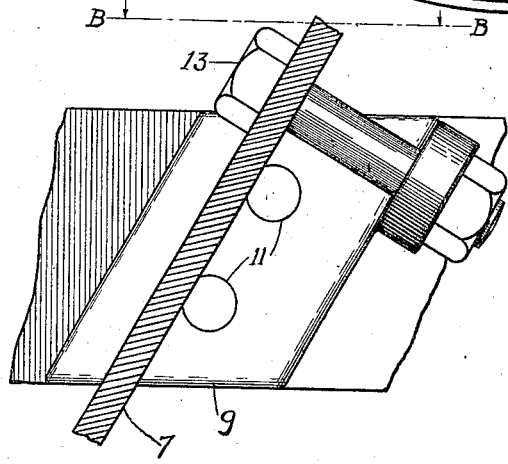
Fig. 2 is an enlarged sectional view taken on the line A—A, Fig. 1, showing the means for securing certain of the cams to the wheel lugs.
Figure 3:
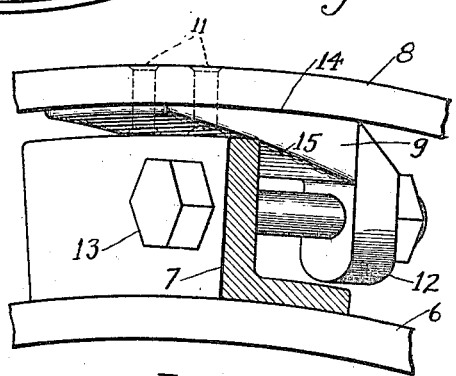
Fig. 3 is a detail view looking in the direction of the arrows B—B, Fig. 2.

Each of the cams 9 and 10 is rhomboidal in plan as shown in Fig. 2 and triangular in longitudinal cross section as shown in Fig. 3, the outer face 14 being curved to a radius to fit the tire, and the inner face 15 also being curved to cause engagement of the cam with a traction lug across the entire width of the cam. While I prefer to have the face 15 curved, it may be a plane surface and still be within the contemplation of my invention, but a curved or warped surface ensures better engagement of the cam with the lug at all positions of adjustment and is therefore preferable. The cams 9 and 10 are spaced on the tire to correspond with the spacing of the traction lugs 7, and while I have shown cams engaging alternate lugs, it is to be understood that the number of cams relative to the lugs may be varied to suit the load on the wheel and the spacing of the lugs. Also I have shown equal numbers of both the lugs 9 and 10 but this is not necessary and the ratio may vary, sufficient lugs 9 being used in all cases to securely hold the tire 8 on the wheel.

When it is desired to equip the tractor with my slip-over tire, the tractor wheel is raised from the ground by a jack or by running the wheel on a heavy plank so that the greater portion of the wheel will overhang. The tire is then slipped over the lugs with the cams 9 adjacent the corresponding lugs 7 that are drilled to receive the bolts 13. The tire is then rotated slightly to cause the cams to ride up on the traction lugs and permit the bolts 13 to be inserted and their nuts tightened to draw the cams up tightly.

It is to be noted that Fig. 1 illustrates the slip-over tire applied to the right hand wheel of a tractor, the direction of rotation being clockwise, as indicated by the arrow, so that rotation of the tractor wheel tends to cause the lugs 7 to ride up on the cams 9 and 10 to keep them tight and relieve the bolts 13 of strain. When it is desired to remove the tire, the bolts 13 are loosened and the tractor backed very slightly to release the lugs from the cams. The wheel is then raised slightly from the ground and the tire lifted off.

The cams shown in the drawing are adapted only for use on the right hand tire, those for the left hand tire being reversely formed but otherwise similar in all respects. Right and left-hand cams are necessitated since the diagonal traction lugs 7 are oppositely pitched on the two drive wheels. However if the lugs 7 extend parallel to the axes of the wheels or if other types of lugs are used, the cams will be rectangular in plan instead of rhomboidal and the tires will be interchangeable on the two sides of the tractor.

While I have illustrated but a single embodiment of my invention, it will be apparent to those skilled in the art that it is capble of many modifications and I desire to secure as my invention all such modifications as may fall within the scope of the subjoined claims.

I claim—

1. In combination, a wheel having ground-engaging traction lugs secured to its periphery, a supplemental rim of greater diameter than the wheel, and means comprising a plurality of circumferentially spaced cams and tightening means secured to the rim and lugs for securing the rim to the lugs whereby the lugs will be maintained out of engagement with the ground.

2. In combination, a wheel provided with traction lugs, a slip-over tire having a plurality of cams on its inner periphery for engagement with the traction lugs, whereby rotation of the wheel in one direction will tend to tighten the tire on the lugs and rotation in the opposite direction will tend to loosen the tire from the lugs, and means for detachably securing one of the cams to a traction lug.

3. In combination, a wheel provided with a plurality of traction lugs, a slip-over tire encompassing the lugs, a plurality of tapered cams on the tire and engaging the ings, and means for securing a plurality of the cams to the lugs.

4. In combination, a wheel having ground-engaging traction lugs on its periphery, a tire encompassing the lugs, a plurality of cams secured to the tire and engaging the lugs, and means extending through cooperating lugs and cams for securing the tire to the wheel.

5. In combination, a wheel having L-shaped traction lugs on its periphery, a flat tire encompassing the lugs, a plurality of cams secured to the tire and engaging traction lugs, a lug on one of the cams, and means engaging the cam lug and traction lug to prevent disengagement of the traction lugs and cams.

6. In combination, a wheel having L-shaped traction lugs on its periphery, a flat tire encompassing the lugs, a plurality of cams secured to the tire and engaging traction lugs, certain of the cams having inwardly extending perforated lugs, and means passing through the perforations in the cam lugs and corresponding perforations in the traction lugs to prevent disengagement of the traction lugs and cams.

In testimony whereof I affix my signature.

EDWARD A. JOHNSTON.